(12) United States Patent
Quere et al.

(10) Patent No.: US 10,536,745 B2
(45) Date of Patent: Jan. 14, 2020

(54) METHOD FOR AUDIO DETECTION AND CORRESPONDING DEVICE

(71) Applicant: THOMSON Licensing, Issy-les-Moulineaux (FR)

(72) Inventors: Thierry Quere, Montfort sur Meu (FR); Pascal Baudeloche, Cesson Sevigne (FR); Renaud Rigal, Cesson-Sevigne (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/070,284

(22) PCT Filed: Jan. 18, 2017

(86) PCT No.: PCT/EP2017/050937
§ 371 (c)(1),
(2) Date: Jul. 15, 2018

(87) PCT Pub. No.: WO2017/129456
PCT Pub. Date: Aug. 3, 2017

(65) Prior Publication Data
US 2019/0020918 A1    Jan. 17, 2019

(30) Foreign Application Priority Data
Jan. 25, 2016  (EP) .................................... 16305061

(51) Int. Cl.
*H04N 21/439*  (2011.01)
*H04N 21/43*   (2011.01)
*H04N 21/431*  (2011.01)
*H04N 21/454*  (2011.01)

(52) U.S. Cl.
CPC ..... *H04N 21/4394* (2013.01); *H04N 21/4307* (2013.01); *H04N 21/4312* (2013.01)

(58) Field of Classification Search
USPC .................................................. 386/239–248
See application file for complete search history.

(56) References Cited

U.S. PATENT DOCUMENTS

| 7,020,894 | B1 | 3/2006 | Godwin et al. |
| 8,837,604 | B2 | 9/2014 | Bush |
| 9,179,118 | B2 | 11/2015 | Zeng et al. |

(Continued)

FOREIGN PATENT DOCUMENTS

| EP | 1071290 | | 1/2001 | | |
| EP | 2 395 658 A2 | * | 12/2011 | ............... | H03G 3/32 |
| WO | WO 2017/174150 A1 | * | 10/2017 | ............... | H04S 7/00 |

OTHER PUBLICATIONS

Anonymous, "Codecinfo From Kodi", http://kodi.wiki/view/codeinfo, Jul. 29, 2015, pp. 1-3.

(Continued)

*Primary Examiner* — Hung Q Dang
(74) *Attorney, Agent, or Firm* — Brian J. Dorini; Patricia A. Verlangieri (57) ABSTRACT

A method, arrangement and device comprising the arrangement enabling to determine if audio data is present in a digital audio/video stream. If presence of audio data is determined and audio is muted and/or below a determined level, a visual indication is generated which indicates the presence of audio data in the digital audio/video stream.

13 Claims, 8 Drawing Sheets (56) References Cited

U.S. PATENT DOCUMENTS

| | | | |
|---|---|---|---|
| 10,055,887 B1* | 8/2018 | Gil ........................ | G06T 19/006 |
| 2004/0252979 A1* | 12/2004 | Momosaki ............. | H04N 5/445 |
| | | | 386/244 |
| 2010/0074450 A1* | 3/2010 | Liao ........................ | H03G 3/32 |
| | | | 381/57 |
| 2011/0103598 A1* | 5/2011 | Fukui ................ | H04M 1/72569 |
| | | | 381/57 |
| 2012/0087516 A1* | 4/2012 | Amin ....................... | H03G 3/32 |
| | | | 381/107 |
| 2015/0195427 A1 | 7/2015 | Yeh et al. | |
| 2016/0065888 A1* | 3/2016 | Matsubara ............. | G11B 27/34 |
| | | | 386/249 |
| 2017/0111677 A1* | 4/2017 | Wassingbo ......... | H04N 21/2387 |

OTHER PUBLICATIONS

Fischer, W., "3 The MPEG Data Stream", Digital Television: A Pratical Guide for Engineers, Fischer, W., Berlin, 2004, pp. 26-28.

\* cited by examiner

PRIOR ART

METHOD FOR AUDIO DETECTION AND CORRESPONDING DEVICE

This application claims the benefit, under 35 U.S.C. § 365 of International Application PCT/EP2017/050937, filed Jan. 18, 2017, which was published in accordance with PCT Article 21(2) on Aug. 3, 2017, in English, and which claims the benefit of European Patent Application No. 16305061.0, filed on Jan. 25, 2016.

FIELD

The present disclosure generally relates to the field of detection of audio associated with video.

BACKGROUND

One of the things to test when test benching the performance of an audio/video receiver such as a set top box or digital television receiver, is the correct execution of a channel change under varying circumstances and for different channel sources and audio/video configurations. If many audio/video receivers are tested simultaneously, e.g., in a video-wall like set up for a test bed configuration, it is difficult for a single test engineer to verify audio rendering features individually for all the tested audio/video receivers, e.g. after a channel change. There is a difficulty, when confronted with a multitude of simultaneous audio sources, to identify which of the tested audio/video receiver produces which audio. An audio switch may help to enable a test operator to switch between identified audio sources for monitoring of channel change and to verify if and when audio is rendered with video, e.g., after a channel change. But manually testing many receivers is long and tedious. In addition, the test engineer may be induced in error when a channel change or a change of audio/video source is operated during a silence on the new channel or the changed audio/video source. This results in audio being rendered relatively late in the channel change or in the audio/video source change process, and the test engineer may erroneously conclude that the tested audio/video receiver does not function properly. Further, it may be difficult for the test engineer to verify (lip) synchronization between audio and video after a channel change when the audio channel that accompanies the video of the new channel cannot be directly and visibly related to movement in the video.

For viewers that watch videos such as proposed by the video-sharing website YouTube, it is interesting to know if a video comprises audio or not and at what volume level audio is set, since a significant number of videos are proposed without audio and audio volume levels are not standardized.

For a viewer of an audio/video stream rendered by an audio/video rendering device, it is difficult to verify the presence of audio in an audio/video stream in a noisy environment or when audio is muted. Headphones can cause serious hearing loss to its wearer when the user is unaware that the audio will be rendered at high volume when audio is unmuted.

There is thus a need for improvement of detection of audio associated with video.

SUMMARY

The present disclosure aims at alleviating at least some of the deficiencies discussed in the background section.

To this end, the present principles comprise a method for providing a visual indication of a state of audio associated with video rendering of a digital audio/video stream, implemented by an audio/video receiver device. If the digital audio/video stream comprises audio data and audio data rendering is muted or the digital audio/video stream comprises audio data and audio data rendering volume is below a determined level, a visual indication of presence of the audio data in the digital audio/video stream is generated. The visual indication signals a viewer of the digital audio/video stream that the digital audio/video stream comprises audio data and that the audio data rendering is muted or that the digital audio/video stream comprises audio data and that the audio data rendering volume is below the determined level.

According to a variant embodiment of the method, the method further comprises determining a delay time between reception of the digital audio/video stream and the presence of audio in the digital audio/video stream and indicating via the visual indication the delay time.

According to a variant embodiment of the method, the method further comprises detecting a synchronization of the audio data with video data in the digital audio/video stream and indicating via the visual indication a detection of the synchronization.

According to a variant embodiment of the method, the synchronization is detected if audio decoding has started, and if a Presentation Time Stamp of a currently decoded audio frame is within a tolerance value around a current value of a System Time Clock of the audio/video receiver device.

According to a variant embodiment of the method, the method further comprises indicating an audio data rendering volume level through the visual indication when the audio data rendering is muted, the indicated audio data rendering volume level informing a viewer of the digital audio/video stream a volume level with which the audio data will be rendered when the audio data rendering is unmuted.

According to a variant embodiment of the method, the method further comprises determining if audio descrambling is authorized by access control and indicating via the visual indication if audio descrambling is not authorized by access control.

According to a variant embodiment of the method, the method further comprises determining if the tolerance value is within determined bounds and indicating via the visual indication that the tolerance is within the determined bounds.

The present disclosure also relates to an arrangement for providing a visual indication of a state of audio associated with video rendering of a digital audio/video stream, comprising a controller configured to determine if audio data is present in the digital audio/video stream and to determine if audio is muted or if audio data rendering volume is below a level, and comprising a visual indication generator configured to generate a visual indication of presence of the audio data in the digital data stream according to the determining by the controller, the visual indication signaling a viewer of said digital audio/video stream that the digital audio/video stream comprises audio data and that the audio data rendering is muted or that the digital audio/video stream comprises audio data and that the audio data rendering volume is below the determined level.

According to a variant embodiment of the arrangement, the controller is further configured to determine a delay time between reception of the digital audio/video stream and the presence of audio in the digital audio/video stream and wherein the visual indication generator is further configured to generate a visual indication for indicating the delay time.

According to a variant embodiment of the arrangement, the controller is further configured to detect a synchronization of the audio data with video data in the digital audio/video stream and wherein the visual indication generator is further configured to generate a visual indication for indicating the detection of the synchronization.

According to a variant embodiment of the arrangement, the controller is further configured to detect the synchronization if audio decoding has started and if a Presentation Time Stamp of a currently decoded audio frame is within a tolerance value around a current value of a System Time Clock.

According to a variant embodiment of the arrangement, the visual indication generator is further configured to indicate an audio data rendering volume level through the visual indication when the audio data rendering is muted, the indicated audio data rendering volume level informing a viewer of the digital audio/video stream a volume level with which the audio data will be rendered when the audio data rendering is unmuted.

According to a variant embodiment of the arrangement, the controller is further configured to determine if audio descrambling is authorized by access control and wherein the visual indication generator is further configured to generate a visual indication for indicating if the audio descrambling is not authorized by access control.

According to a variant embodiment of the arrangement, the controller is further configured to determine if the tolerance value is within determined bounds and wherein the visual indication generator is further configured to generate a visual indication for indicating if the tolerance value is within determined bounds.

According to a variant embodiment of the arrangement, the arrangement is comprised in a mobile device. Examples of mobile devices are mobile phones, smartphones, tablets, portable computers, and any portable device capable of audio/video reception.

According to a variant embodiment of the arrangement, the arrangement is comprised in a set top box.

According to a variant embodiment of the arrangement, the arrangement is comprised in a digital television.

BRIEF DESCRIPTION OF THE DRAWINGS

More advantages of the present disclosure will appear through the description of particular, non-restricting embodiments. In order to describe the manner in which the advantages of the present disclosure can be obtained, particular descriptions of the present principles are rendered by reference to specific embodiments thereof which are illustrated in the appended drawings. The drawings depict exemplary embodiments of the disclosure and are therefore not to be considered as limiting its scope. The embodiments described can be combined to form particular advantageous embodiments. In the following figures, items with same reference numbers as items already described in a previous figure will not be described again to avoid unnecessary obscuring the disclosure.

The exemplary embodiments will be described with reference to the following figures.

DETAILED DESCRIPTION

Figure 1:
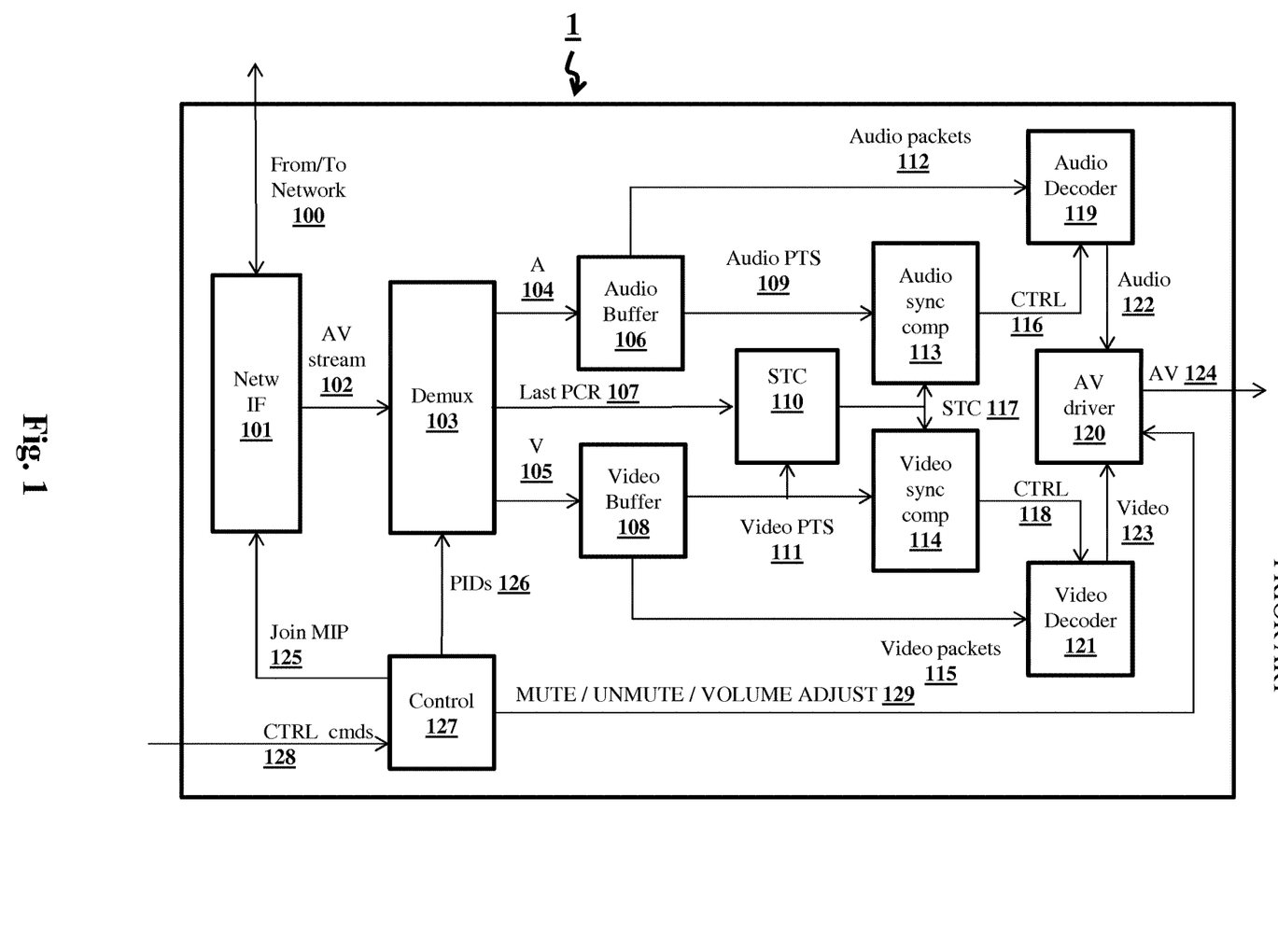
FIG. 1 is a prior art audio/video receiver.

FIG. 1 is a prior art audio/video receiver. The audio/video receiver 1 is for example as comprised in an Internet Protocol (IP) Set-Top Box (STB), as comprised in a digital television or in a mobile device such as a smartphone or a tablet. Via a network interface 101 that is connected to a wired or wireless network 100, audio/video receiver 1 receives a digital data stream 102 from a source (not shown). Digital data stream 102 is demultiplexed in a demultiplexer 103 ("demux"), which extracts packets comprised in the digital data stream and outputs audio related packets 104 and video related packets 105. Audio packets are fed to audio buffer 106 and video packets are fed to video buffer 108. At the output of the video buffer, video presentation time stamps (PTS) packets are provided to internal System Time Clock (STC) 110. The STC is a counter that is typically incremented with a frequency that is close to that of the encoder clock used for encoding the digital data stream. Program clock reference (PCR) packets comprised in AV streams are used for continuous decoder-encoder synchronization in AV receivers with a front-end, for example a tuner front-end for a satellite- or digital terrestrial television (DTT) reception. Audio and video PTS are timing packets that comprise time stamps values that are related to the PCR, and that indicate at which value of PCR audio or video packets that follow PTS in the digital data stream are to be presented (or "rendered"). In IP receivers however PCR packets are used for initial decoder-encoder synchronization but are not used for continuous decoder-encoder synchronization because of technical infeasibility due to transport jitter introduced by the asynchronous character of the IP delivery network. For IP audio/video receiver 1, in order to synchronize the decoder clock with the encoder clock, the STC is initialized once (e.g. during channel change) with the value of a received PCR 107. STC 110 outputs STC counter values 117. From the audio buffer 106, audio packets 112 are input to audio decoder 119. From the video buffer 108, video packets are input to the video decoder 121. Further from audio buffer 106, audio PTS 109 are input to audio sync comparator 113. Further from video buffer 108, video PTS 111 are input to a video sync comparator 114. The values from the STC 110 are input to an audio sync comparator 113 and to a video sync comparator 114. The audio sync comparator 113 compares the received audio PTS 109 with the STC values 117. If a received audio PTS 109 is equal to an STC value 117, it outputs a control signal 116 to audio decoder 119, which outputs decoded audio 122. For video, this is the same; the video sync comparator 114 compares the received video PTS 111 with the STC values 117. If a received video PTS 111 is equal to an STC value 117, it outputs a control signal 118 to the video decoder 121, which outputs decoded video 123. Finally, an audio/video driver 124 converts, amplifies and adapts audio/video for output on audio/video output 124. A controller 127 controls the operation of the device 1. The controller 127 receives input control commands 128, such as channel change commands or audio mute/unmute/volume control commands. If the control command 128 is a channel change command, the controller instructs the network interface 101 to join the multicast IP address of the channel and instructs 126 the demux 103 to filter PIDs corresponding to audio and video streams. If the control command 128 is a mute, unmute or volume adjust command, the controller instructs 129 the AV driver 120 to mute, unmute or control the audio output volume. Optionally, the receiver 1 comprises an input interface (not shown) for receiving user commands from for example a tactile screen, a mouse, a keyboard, and/or a remote control device.

As briefly discussed in the background section, one of the things to test when test benching the performance of an audio/video receiver such receiver 1, is the correct execution of a channel change or change of audio/video source under varying circumstances and for different channel sources and audio/video configurations. It may be desirable to verify the presence of audio accompanying a video and the delay of the rendering of audio relative to the rendering of the video and the delay between audio lip synchronization with video rendering after a channel change or change of audio/video source. If many audio/video receivers are tested simultaneously, e.g., in a video-wall like set up for a test bed configuration, it is difficult for a single test engineer to verify audio rendering features during channel change or change of audio/video source for all the tested audio/video receivers individually. In addition, the test engineer may be induced in error when the change is operated during a silence on the new channel or new source. This results in audio being rendered relatively late in the change process. Then the test engineer may erroneously conclude that the audio was rendered too late and that the audio/video receiver under test malfunctions. Further, it may be difficult to verify synchronization between audio and video after a channel/source change when audio accompanying the video of the new channel/source cannot be directly and visibly be related to the video displayed. When changing or selecting a video source with YouTube like applications it is difficult for a user to determine presence of associated audio and correct volume level adjustment as a significant number of video sources do not comprise associated audio and audio levels are not standardized. For a viewer of an audio/video stream rendered by an audio/video rendering device, it is difficult to verify the presence of audio in an audio/video stream in a noisy environment or when audio is muted. Headphones can cause serious hearing loss to its wearer when the user is unaware that the audio will be rendered at high volume when audio is unmuted. Unmuting a high volume audio can also be embarrassing for a viewer when watching an audio/video stream in a public environment when the audio is rendered on a speaker set.

Embodiments of the present principles described hereafter enable to overcome at least some of the above mentioned disadvantages.

Figure 2:
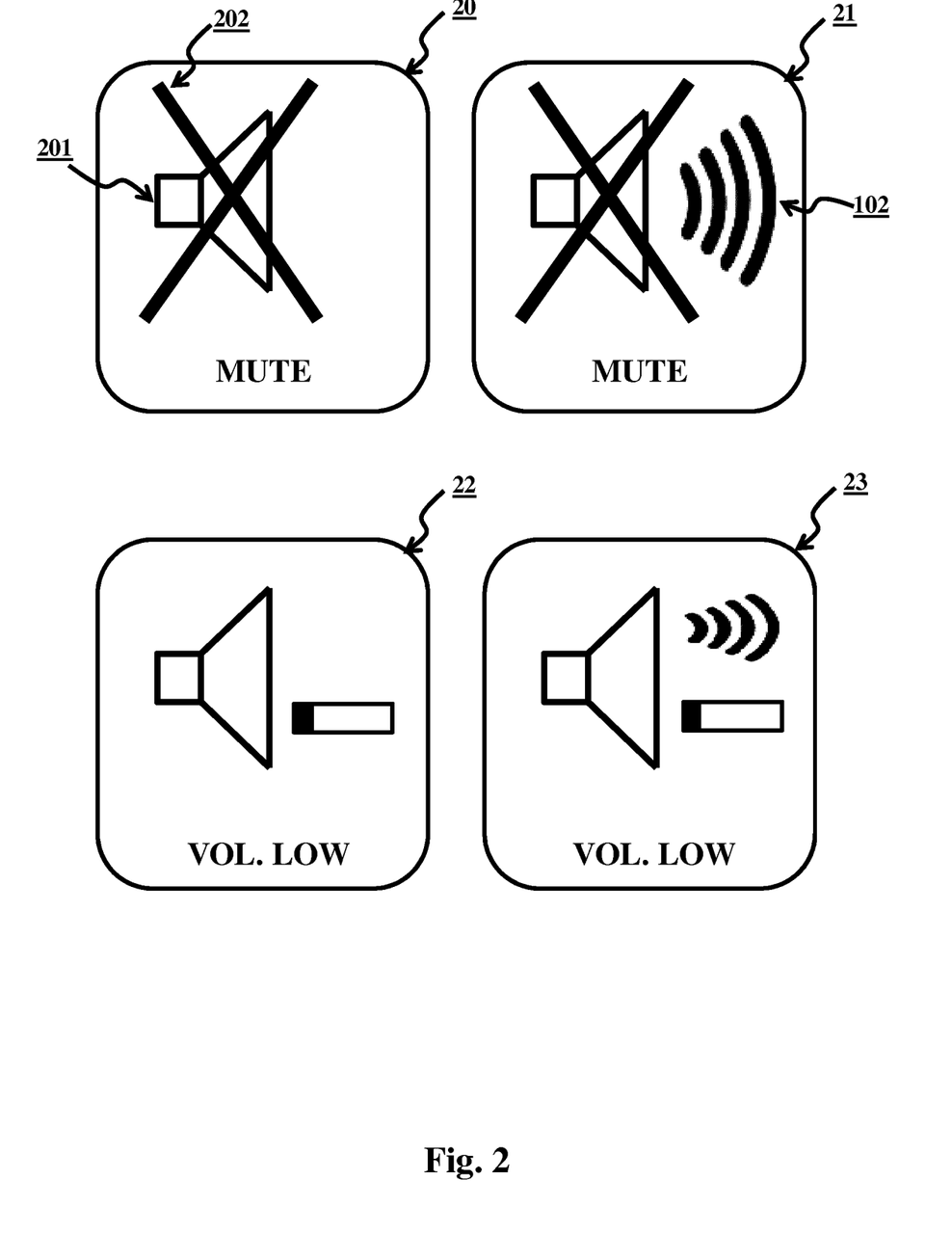
FIG. 2 is an example visual indication according to the present principles.

FIG. 2 are example visual indications according to the present principles. An icon 20 visually indicates that audio is muted by showing a strike-through loudspeaker 201. Icon 21 shows that audio is muted and additionally shows that audio data is present by showing sound waves 202 beside a strike-through loudspeaker. Icon 22 visually indicates that audio is not muted but volume is set below a certain (determined) level, for example too low to be audible, displaying a volume gauge with low volume indication. Icon 23 visually indicates that audio is not muted, that volume is set below the determined level, and that presence of audio is detected. The volume indication can also be realized without volume gauge and with soundwaves only, for example the display of only one soundwave out of maximum three means low level audio, while the display of two soundwaves indicates mean level audio, and the display of three soundwaves indicates high level audio. In the case when the audio is muted, the display of the number of soundwaves is an indication to the viewer of the volume level of the audio with which the audio will be rendered when the viewer will unmute the audio. This enables the viewer to anticipate, e.g., the viewer can lower the audio volume before unmuting when audio volume is high and thereby avoid hearing damage, hearing discomfort or public embarrassment, or to the contrary, the viewer can increase a low audio volume before unmuting to enable the audio to be audible when it is unmuted. The feature is particularly advantageous when changing from one audio/video stream to another, or when changing from one input source from another. For example, a user of a digital television receiver may connect his smartphone to an USB or HDMI interface of the digital television receiver and play audio stored in his smartphone via a home cinema connected to the digital television receiver. The audio output volume level of the smartphone may be low, and the user may increase the audio volume of the home cinema to a desired level. The user mutes the audio on the digital television receiver as he receives an incoming call. Having answered the call, he changes to a broadcast channel on his digital television. The visual indication according to an embodiment of the present principles will inform the user that audio is muted and is set at a high level. The user can now lower the volume level before unmuting the audio. Generating of the visual indication under the described conditions (e.g., audio present and audio muted, audio present and audio volume level lower than a determined level), advantageously avoids to encumber the video rendering with visual indications when the described conditions do not apply, and thereby increases the efficiency of alerting the viewer through the visual indications.

Figure 3:
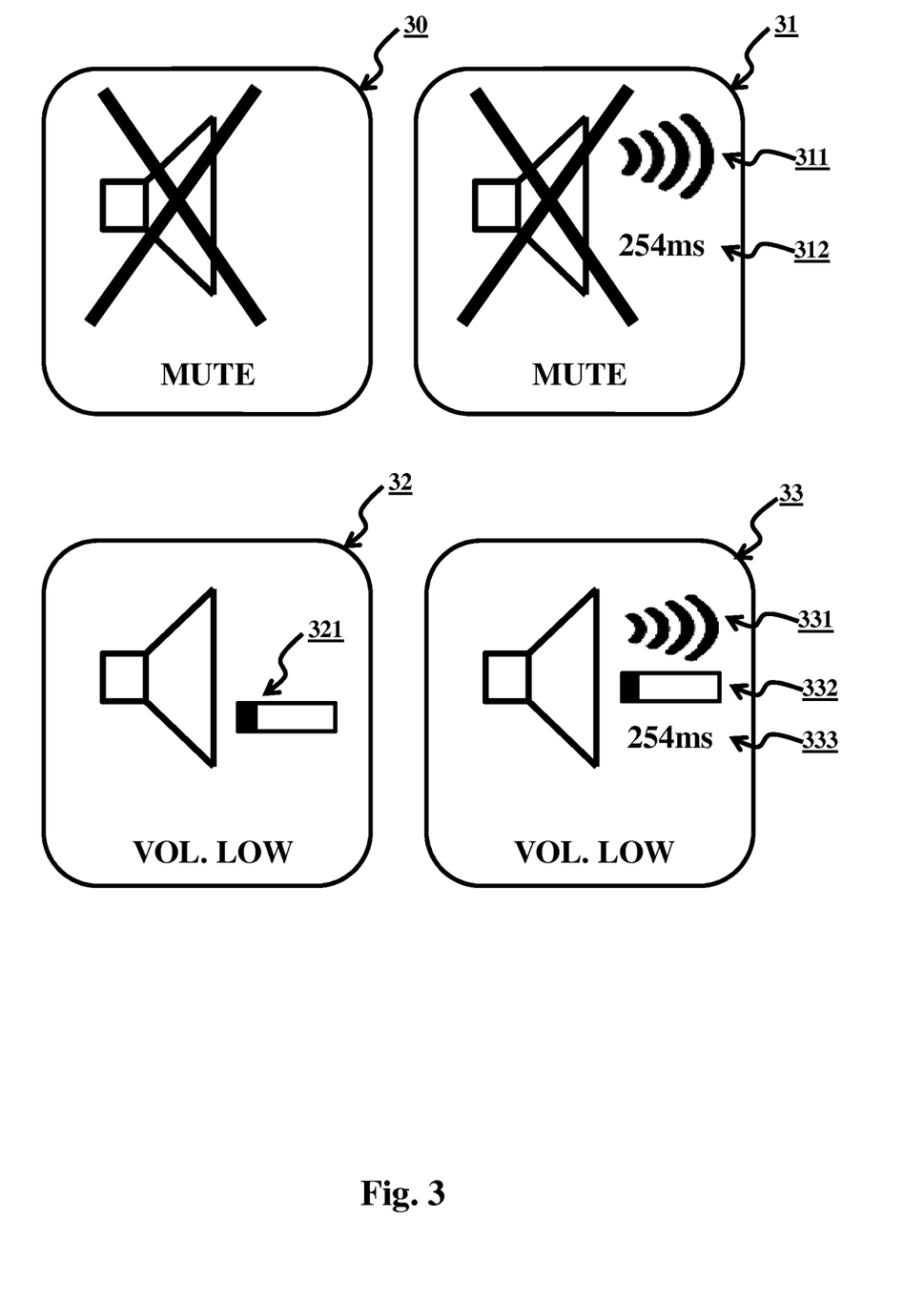
FIG. 3 is a further example visual indication according to the present principles.

FIG. 3 is a further example of visual indications according to the present principles. Icon 30 indicates that audio is muted and no presence of audio is detected: only a strike-through loudspeaker is shown. Icon 31 indicates that audio is muted (strike-through loudspeaker), that presence of audio is detected (audio waves 311), and a delay time 312 between the reception of the digital data stream after a channel/source change and detection of synchronization of audio data with video data. Icon 32 indicates that audio is not muted, that no presence of audio is detected (loudspeaker not stroked-through) and that volume is set to a level that is lower than a determined level (volume gauge 321), e.g., at an inaudible level. Icon 33 indicates that audio is not muted (loudspeaker not stroked-through) but is set to a low level that is under the previously mentioned determined level (volume gauge 332), that presence of audio is detected (sound waves 331), and further indicates a delay time 333 between the reception of the digital audio/video stream after a channel or source change and detection of synchronization of audio data with video data.

Figure 4:
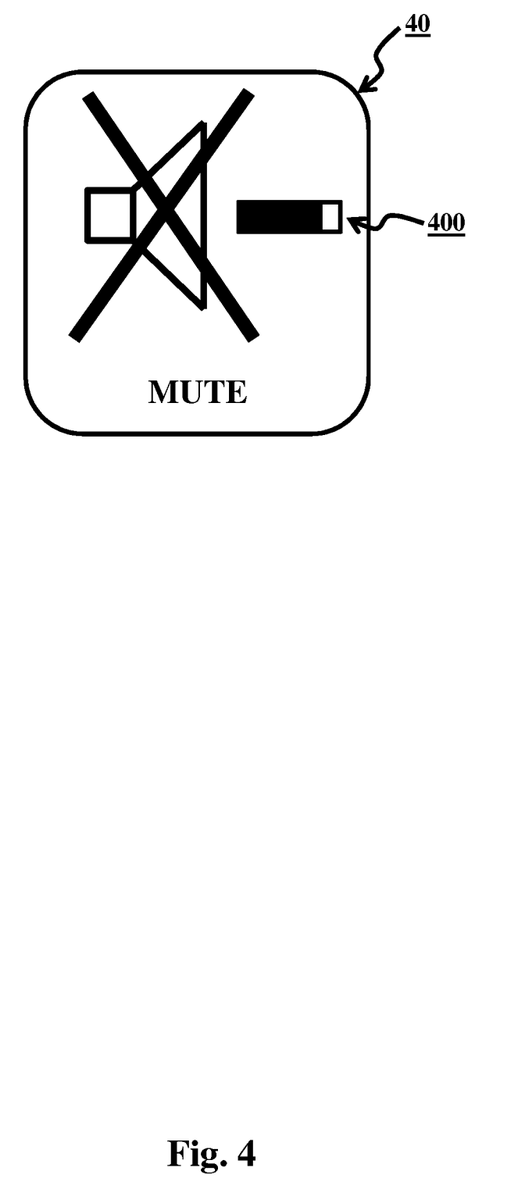
FIG. 4 is a further example visual indication according to the present principles.

FIG. 4 is a further example visual indication according to the present principles. Icon 40 indicates with volume gauge 400 high level that while audio is muted, amplifier volume is set at a very high level. With this icon, the user of a device integrating the present principles is informed that if the audio is unmuted, the sound will be rendered with a very high volume. If this is not desired e.g., to avoid hearing damage, the user can adjust the audio amplifier volume before unmuting the audio.

Figure 5:
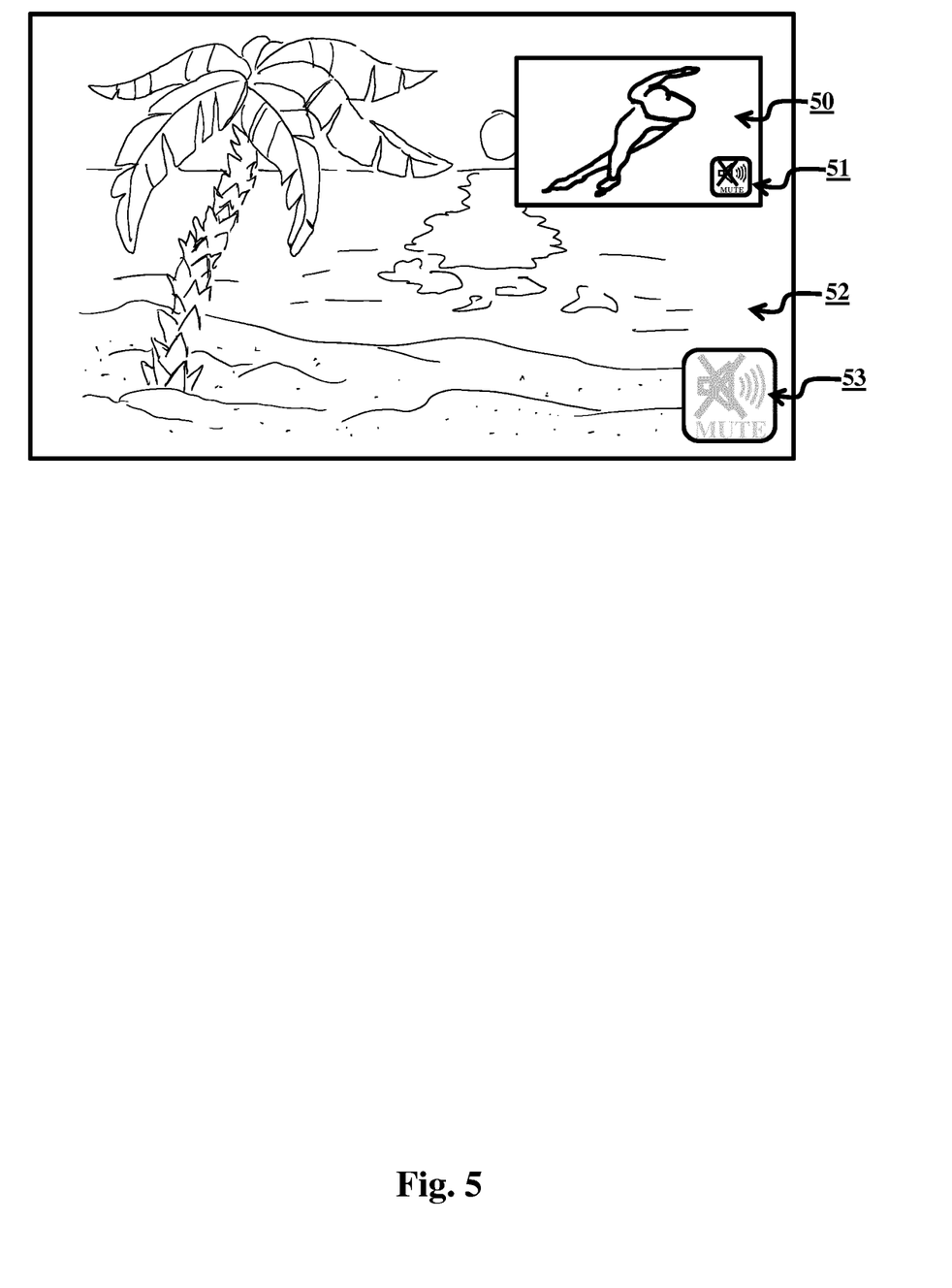
FIG. 5 is an embodiment of an audio/video receiver with Picture in Picture (PIP) implementing the present principles.

FIG. 5 is an embodiment of an audio/video receiver with Picture in Picture (PIP) implementing the present principles. Element 52 is an image of a video received from a first source, e.g., from a digital terrestrial receiver comprised in the audio/video receiver. Element 50 is an image of a video received from a second source, e.g., from a satellite receiver connected to an external input of the audio/video receiver. The audio/video receiver enables to toggle audio focus between either one of the sources; i.e., if focus is set to the first source, audio is rendered that is associated with the first source. If focus is set to the second source, audio is rendered that is associated with the second source. In the example of FIG. 5, focus is set to the second source. Therefore, the visual indication 53 of the audio of the first source is grayed out, while the visual indication 51 of the audio associated with the second source is not. For the first audio source, the visual indication 53 shows that audio is present but muted, even if the visual indication is for example grayed out to indicate that the focus is set to another source. For the second source, the icon 51 shows that audio is present but muted. The same principles can be applied to other multiple screen configurations such as Picture Aside Picture (PAP).

Figure 6:
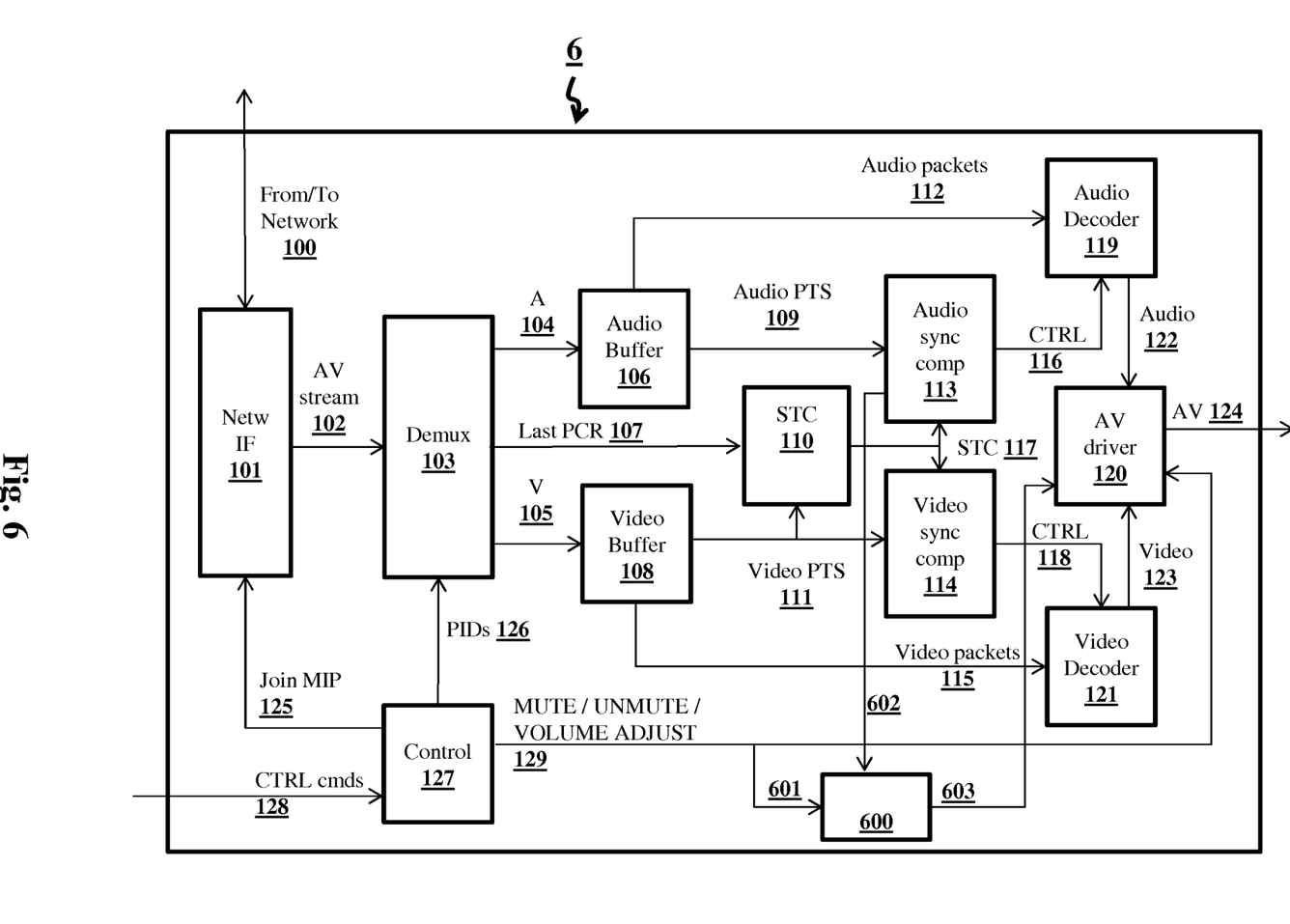
FIG. 6 is an embodiment of an audio/video receiver implementing the present principles.

FIG. 6 is an embodiment of an audio/video receiver device implementing the present principles. In addition to the elements already discussed for the prior art audio/video receiver of FIG. 1, the audio/video receiver device 6 comprises an audio presence supervisor 600. Audio presence supervisor 600 receives a first input signal 601 from controller 127. This input signal allows audio presence supervisor 600 to determine if audio is muted, unmuted, and at which level the volume is set, so that it can determine if audio level is set below a predetermined level, e.g. below an audible level. Audio presence supervisor 600 receives a second input signal 602 from audio sync comparator 113. This enables the audio presence supervisor to determine if audio data is present and synchronized. The output of audio presence supervisor 600 is connected to audio/video driver 120, for generation of a visual indication according to the present principles. According to a variant embodiment, audio presence supervisor 600 receives further input from controller 127, for informing it of a channel change. According to a further variant embodiment, audio presence supervisor 600 receives further input from a clock unit (not shown) and from network interface 101, which enables the audio presence supervisor 600 to determine delay time between a reception of a digital data stream and presence of associated audio. According to a further variant embodiment, the audio presence supervisor further receives input from STC 110, enabling it to determine if a presentation time stamp of a currently decoded audio frame is within a tolerance value around a current value of the STC, thereby enabling it to detect a synchronization between the audio associated with the video. The tolerance value depends on requirements; e.g., for a Dolby © certification, the tolerance value is set to a maximum range of −10 to 15 ms, while for basic lip synchronization, the tolerance value is set to a range of maximum −50 to +50 ms. According to a further variant embodiment, to show if the audio delay is within certain bounds further information is displayed; e.g., in one of the icons illustrated in FIGS. 2 to 4, further information is displayed indicating high quality audio/video synchronization, e.g. for an audio/video delay (audio PTS compared to STC value) that is within the discussed tolerance for Dolby certification. According to a further variant that combines with any of the previously discussed variant embodiments, the audio presence supervisor 600 receives further input from a Control Access (CA) module for descrambling/decryption of digital streams that are protected through an access control mechanism. This enables it to detect if the audio descrambling is authorized or not, and to indicate presence of audio associated with video when audio can be descrambled. Alternatively, the presence of audio can be indicated, while, if the descrambling is not authorized by the access control module, an additional indication shows that descrambling is not authorized. The additional indication can take the form of a padlock or any other symbol that suggests locked access.

An arrangement according to the present principles can be implemented, for example, in a mobile device, a set top box, or a digital television.

Figure 7:
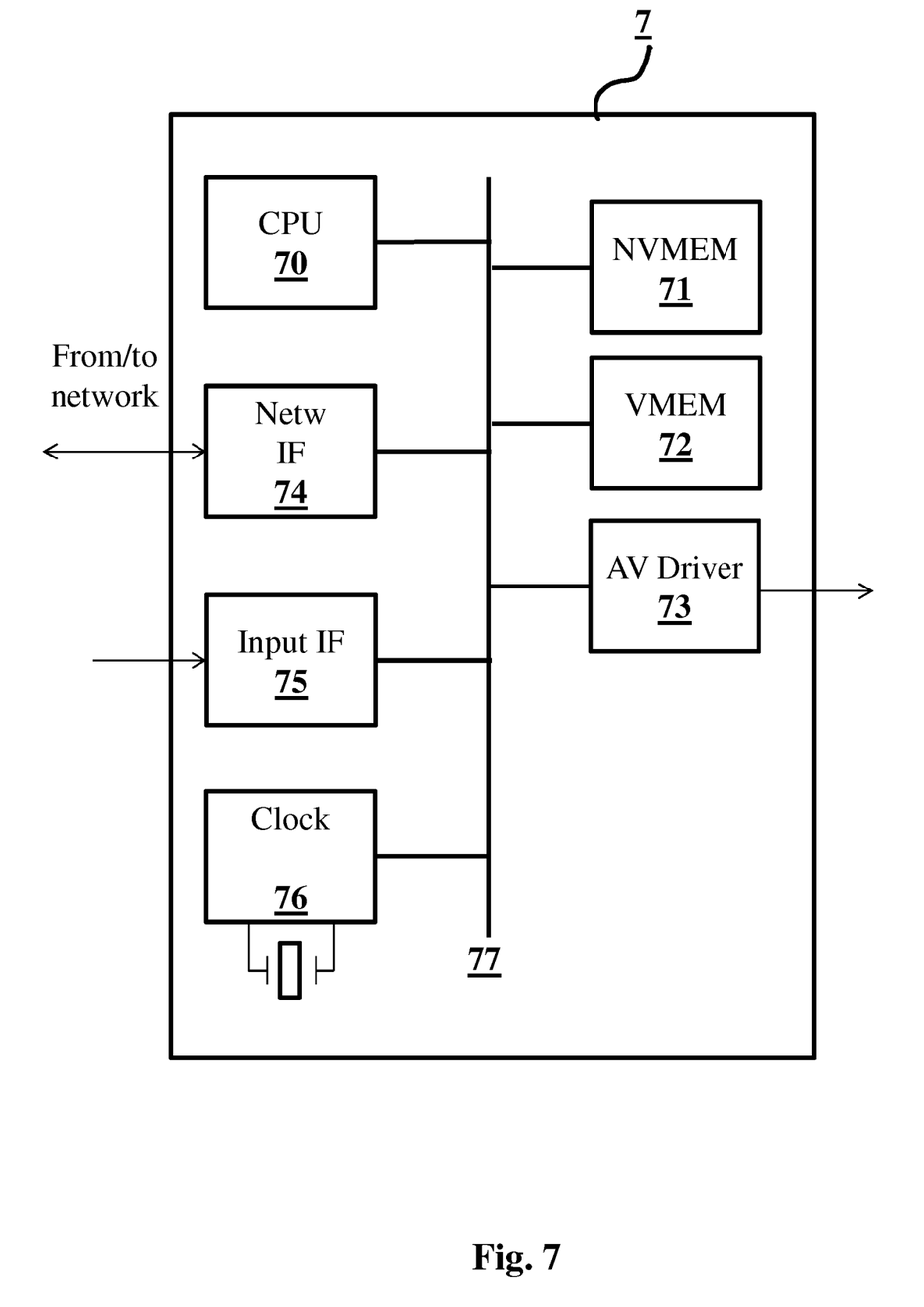
FIG. 7 is a variant embodiment of a device for implementing the present principles.

FIG. 7 is a variant embodiment of a device 6 for implementing the present principles. The device comprises a central processing unit 70 or CPU, a network interface 74, an input interface 75, a clock unit 76, a non-volatile memory 71, a volatile memory 72, and an audio/video driver unit 73. All of these elements are connected to an internal data communication bus 77. Input interface 75 receives input commands such as channel change commands. Network interface 74 receives digital audio/video streams. Central processor 70 is configured to determine if audio data is present in an audio/video stream received, and further to determine if audio is muted and/or below a level, and to generate an appropriate visual indication using audio/video driver 73. Optionally, the appropriate visual indication is generated by a specific graphics rendering device such as a graphics card with a dedicated processor. Computer program instructions implementing the method according to the present principles are for example stored in non-volatile memory 71, while values of temporary variables such as current volume level or mute/unmute setting are stored in volatile memory 72.

Figure 8:
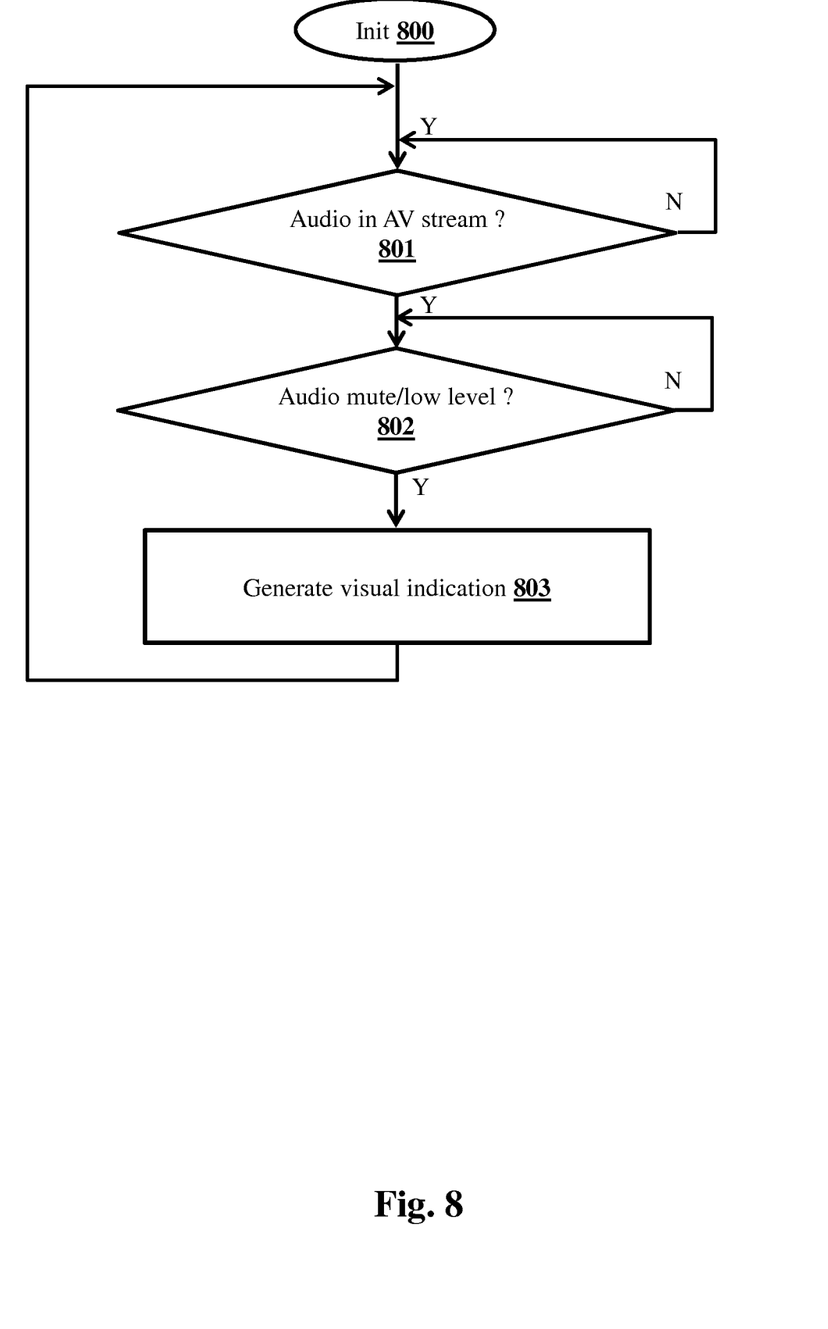
FIG. 8 is a flow chart according to a particular embodiment of the present principles.

FIG. 8 is a flow chart according to a particular embodiment of a method according to the present principles. The first step 800 is an initialization step wherein variables and parameters are initialized that are used for the method. In a step 801, it is determined if audio data is present in a received digital audio/video stream. If audio data is present, it is verified in a step 802 if audio is muted and/or below a level. The level is for example a determined level e.g., a low audio level. Alternatively, the level is determined according to ambient noise, e.g., an audio level that is considered to be low with regard to the presence of ambient noise. For example, an audio level is considered to be too low to be clearly audible given a level of ambient noise. If audio is muted and/or is below a determined level, a visual indication of presence of audio data in the audio/video stream is generated in step 803, and the method returns to step 801.

As will be appreciated by one skilled in the art, some elements in the drawings may not be used or be necessary in all embodiments. Some operations may be executed in parallel. Variant embodiments other than those illustrated and/or described are possible.

As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code and so forth), or an embodiment combining hardware and software aspects that can all generally be defined to herein as a "circuit", "module" or "system". Furthermore, aspects of the present principles can take the form of a computer readable storage medium. Any combination of one or more computer readable storage medium(s) can be utilized.

Thus, for example, it will be appreciated by those skilled in the art that the diagrams presented herein represent conceptual views of illustrative system components and/or circuitry embodying the principles of the present disclosure. Similarly, it will be appreciated that any flow charts, flow diagrams, state transition diagrams, pseudo code, and the like represent various processes which may be substantially represented in computer readable storage media and so executed by a computer or processor, whether or not such computer or processor is explicitly shown.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information there from. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing, as is readily appreciated by one of ordinary skill in the art: a hard disk, a read-only memory (ROM), an erasable programmable read-only memory (EPROM or Flash memory), a portable compact disc read-only memory (CD-ROM), an optical storage device, a magnetic storage device, or any suitable combination of the foregoing.

The invention claimed is:

1. A method for outputting an image of a state of audio associated with video rendering of a digital audio/video stream, wherein the method is implemented by an audio/video receiver device, the method comprising:
   detecting, upon selection of said digital audio/video stream, if said selected digital audio/video stream comprises audio data;
   if said selected digital audio/video stream comprises audio data and audio data rendering volume is not muted and below ambient sound level:
   generating an image representative of presence of said audio data in said selected digital audio/video stream and said image being representative of said audio data rendering volume being below said ambient sound level; and
   outputting said image on an output of said audio/video receiver device.

2. The method according to claim 1, further comprising obtaining a delay time between reception by the audio/video receiver device of said digital audio/video stream upon the selection of the digital audio/video stream and said detecting if said selected digital audio/video stream comprises audio data, and, adding said delay time to said image.

3. The method according to claim 1, further comprising detecting a synchronization of said audio data with video data in said digital audio/video stream and adding information representative of said detected synchronization to said image.

4. The method according to claim 3, wherein said synchronization is detected if audio decoding has started, and if a Presentation Time Stamp of a currently decoded audio frame is within a tolerance value around a current value of a System Time Clock of said audio/video receiver device.

5. The method according to claim 4, further comprising obtaining whether said tolerance value is within bounds and adding to said image information representative of whether said tolerance is within said bounds.

6. The method according to claim 1, further comprising detecting whether audio descrambling is authorized by access control and adding to said image information representative of audio descrambling not being authorized by access control when audio descrambling is not authorized by access control.

7. An arrangement for providing a state of audio associated with video rendering of a digital audio/video stream, wherein the arrangement comprises:
   a controller configured to detect, upon selection of said digital audio/video stream, presence of audio data in said selected digital audio/video stream and to detect, if audio data is present in said selected digital audio/video stream, if audio data rendering volume is not muted and below ambient sound level;
   an image generator configured to generate an image representative of presence of said audio data in said selected digital audio/video stream when audio data is present in said selected audio/video stream and representative of said audio data rendering volume being below said level as detected by said controller; and
   a video output configured to output said selected digital data stream with said image.

8. The arrangement according to claim 7, wherein said controller is further configured to obtain a delay time between reception of said selected digital audio/video stream and said detection of presence of audio in said selected digital audio/video stream and said image generator being further configured to add said delay time to said image.

9. The arrangement according to claim 7, wherein said controller is further configured to detect a synchronization of said audio data with video data in said selected digital audio/video stream and the image generator is further configured to add information representative of a detected synchronization to said image.

10. The arrangement according to claim 9, wherein said controller is further configured to detect said synchronization if audio decoding has started and if a Presentation Time Stamp of a currently decoded audio frame is within a tolerance value around a current value of a System Time Clock.

11. The arrangement according to claim 7, wherein the arrangement is comprised in a mobile device.

12. The arrangement according to claim 7, wherein the arrangement is comprised in a set top box.

13. The arrangement according to claim 7, wherein the arrangement is comprised in a digital television.

* * * * *